United States Patent [19]

Chapman et al.

[11] Patent Number: 5,040,643

[45] Date of Patent: Aug. 20, 1991

[54] RADIAL TORQUE LIMITER

[75] Inventors: John R. Chapman; Gregory C. Hopkins, both of Rockford, Ill.

[73] Assignee: Sundstrand Corporation, Rockford, Ill.

[21] Appl. No.: 566,032

[22] Filed: Aug. 13, 1990

[51] Int. Cl.[5] .............................................. F16D 67/00
[52] U.S. Cl. .................................. 188/134; 188/82.2; 188/82.84
[58] Field of Search .................... 188/134, 82.2, 82.84, 188/82.7, 82.77

[56] References Cited

U.S. PATENT DOCUMENTS

| 3,276,553 | 10/1966 | Tilloy | 188/134 |
|---|---|---|---|
| 3,285,377 | 11/1966 | Rasmussen | 188/134 |
| 3,499,511 | 3/1970 | Bouhot | 188/134 |
| 4,317,511 | 3/1982 | Asai | 192/56 R |
| 4,483,423 | 11/1984 | Renzelmann | 188/134 |
| 4,768,991 | 9/1988 | Kopp | 464/36 |
| 4,792,321 | 12/1988 | Lundquist | 464/35 |

Primary Examiner—Allan D. Herrmann
Assistant Examiner—William O. Trousdell
Attorney, Agent, or Firm—Antonelli, Terry, Stout & Kraus

[57] ABSTRACT

A radial torque limiter, for example, for a geared rotary actuator (1, 1') including input member (S, 8) coupled to an output member (3 or 3') driving a sun gear (4) and planet gears (5) through axially projecting tabs (3g). Roller elements (2) are arranged at ramp sections (3a, 3b, 3c, 3d, 8a, 8b, 8c, 8d) formed at the input member (S, 8) and output member (3 or 3') for radially outwardly displacing the beam spring portions of the output member (3 or 3') to radially apply braking force between an external surface (14) of the beam springs and an internal surface (13) of a grounded reaction member (12) so as to brake the input member (S, 8) and output member (3 or 3') upon an occurrence of an excess transmitted torque.

17 Claims, 3 Drawing Sheets

RADIAL TORQUE LIMITER

Description

1. Technical Field

The present invention relates to a torque limiter and, more particularly, to a radial torque limiter for example, for a geared rotary actuator used in an aircraft to actuate, for example, a leading edge slat actuation system.

2. Background Art

Torque limiters for actuators have been proposed which utilize relative axial motion between a set of ball ramp plates, working against an axial spring load, to produce contact force between sets of stationary and rotating friction surfaces or brake plates, which, in turn, prevent further rotation of the torque limiter input shaft, limiting the torque transmitted to the components beyond the torque limiter.

A disadvantage of the above proposed torque limiters resides in the fact that, by virtue of the relative axial motion, considerably large axial forces in the ball ramp plates results during engagement of the torque limiter that must be contained and reacted by various housings and structural members. To accommodate such large axial forces, the necessary components are often of a larger size and heavier than would otherwise be required in order to react the additional loads imposed by the torque limiter.

Another approach to torque limiting is proposed in, for example, U.S. Pat. No. 4,317,511 with such approach essentially providing for an automatic disconnect clutch rather than a radial torque limiter in that the proposed arrangement disconnects the load from a driving source in the presence of an overload condition whereby the driving device may continue to operate but no output is provided.

A disadvantage of the approach proposed in the above-identified patent resides in the fact that an axial spring is necessary to promote torque transmission across a clutch plate and set of ball elements, which axial spring provides a substantial axial force which must be compensated for by larger and heavier components which, as can well be appreciated, is of significant importance in, for example, aircraft, where weight reduction is a very important factor. Moreover, the provision of the axial spring provides an additional component in the overall system which is subject to failure. Also, positive control of load is lost when load is disconnected.

U.S. Pat. No. 4,768,991 also proposes an overload limiter that clips the amount of torque transmitted between the input and output members by utilizing contoured ball tracks and axial springs.

A disadvantage of the last mentioned patented construction resides in the fact that, as a slip clutch, the construction does not have the ability to self-engage and hold the input shaft. Moreover, the patented construction transmits a significant level of dynamic or oscillatory loads to the output in the event of an overload condition. Additionally, as with U.S. Pat. No. 4,317,511, an axial spring arrangement is necessary in order to set the engagement torque level and, consequently, suffers the same disadvantages noted hereinabove.

U.S. Pat. No. 4,792,321 proposes a radial ball torque limiter for limiting the torque transmitted to the output by allowing ball elements to move along a contoured track while working against a compliant member such as a spring. While similar to U.S. Pat. No. 4,768,991, rather than an axial track and spring, U.S. Pat. No. 4,792,321 utilizes a radial track and spring member.

A disadvantage of the last mentioned patented construction resides in the fact that the radial ball torque limiter is likely to transmit a significant amount of dynamic loading from the input to the output during a torque limiting action. Moreover, the patented construction is unable to lock the input shaft firmly to ground during an overload condition.

DISCLOSURE OF INVENTION

The aim underlying the present invention essentially resides in providing a radial torque limiter which avoids, by simple means, the above-mentioned shortcomings and disadvantages encountered in the prior art and which is lightweight in construction and has a high operational reliability.

The radial torque limiter concept of the present invention utilizes radial instead of axial ball ramp device angles to convert excess transmitted torque into relative motion between the torque limiter input and the output members. The relative motion occurs as a radial deflection in a beam spring forming a part of the output member, causing contact and braking to occur between the output member and a grounded reaction member thereby bringing the torque limiter input and output to a stop and preventing additional torque from reaching a downstream load path.

In accordance with the present invention, relative motion does not occur until the transmitted torque exceeds a reference value established by a force preload between the beam spring and the ball or roller elements.

In accordance with advantageous features of the present invention, a radial torque limiter is provided which includes a means for defining an input torque path for a system, with a means cooperable with said means for defining the input torque path for defining an output torque path of the system. Means are radially outwardly displaceable in response to an excessive torque for radially applying a braking force between the means for defining the output torque path and the grounded reaction member so as to brake the output torque path upon the occurrence of the excess torque, with the braking force being applied to an outer surface of the radially outwardly displaceable means and an inner surface of the grounded reaction member.

The means defining the input torque path in accordance with the present invention includes an input member, with the means defining the output torque path including an output member concentrically disposed with respect to the input member. The means for radially applying the braking force between the input member and the output member includes a spring means radially outwardly displaceable in response to the excessive torque transmitted between the input member and the output member.

The spring means of the present invention may include at least two equally circumferentially spaced springs cooperable with an equal number of diametrically opposed roller means, each associated with a respective spring. The roller means are interposed between the input member and an associated spring, which is integral with or in contact with a radially displaceable component of the output member, with a ramp means being interposed between the respective radially displaceable component and the input member and cooperating with the roller means to enable a displacement of the radially displaceable component and a relative rotation between the input member and output member as a result of the excess torque transmitted between the input member and the output member.

The ramp means are formed in the respective radially displaceable means and the input member. To provide a bidirectional application, an equal number of ramp means are formed with an opposite ramp angle. Depending on the specific construction details, these opposite ramp means may employ the same roller means and spring means in their function as the unidirectional ramp means.

The output member drives the equipment to be provided with torque limiting protection by way of a plurality of axially extending tabs. Preferably, the output member is fashioned as a disc or annular ring having a slot means therein for dividing the annular ring into a main body portion, an annular body portion, and at least two bridging portions connecting the annular band portion to the main body portion. The springs may be formed from the main body portion as beam springs respectively having a fixed end at the respective bridging portions and a free end so as to enable the radial displacement thereof by the roller means.

A diameter of a portion of the input member and an internal diameter of the annular band portion are dimensioned so as to provide a slight clearance therebetween thereby enabling a piloting of the output member by the input member. This piloting does not inhibit relative rotation between the input and output members.

According to particular features of the present invention, at least four roller or ball elements are provided, with such elements being divided in pairs for each direction of torque input and limiting, with the pairs of roller or ball elements being diametrically opposed to each other. Constant radius arcs in the input and output members, located on the other side of the rollers from the radial ramps, allow a free rolling motion of the rollers or ball elements not being used for torque transmission or torque limiting, thereby reducing the effects of friction and roller or ball element skidding upon an operation of the torque limiter.

Unlike overload release clutches or slip clutches, the radial torque limiter of the present invention utilizes an inherent radial stiffness of preloaded structural members to produce a torque transfer.

Moreover, unlike overload clutch or slip clutch, the radial torque limiter of the present invention has the ability to self-engage and hold the input shaft in a fixed position to prevent an excessive input torque from reaching the output.

Yet a further advantage of the radial torque limiter of the present invention resides in the fact that the limiter stops the motion of the input shaft when an overload torque is encountered due to a self-locking action. This advantage is extremely significant when the radial torque limiter of the present invention is utilized with a parallel group of actuators, for example, for use on an aircraft flight control surface. The radial torque limiter will stop the motion of the entire surface and prevent the damage that may be caused when all but one actuator continues to produce an output motion.

Yet a further significant advantage of a radial torque limiter such as proposed by the present invention resides in the fact that the radial torque limiter will produce an essentially constant torque level at the output regardless of the torque present at the input following an overload.

Yet another significant advantage of the present invention resides in the elimination of the axial spring such as, for example, Belleville or coil springs, conventionally used to provide a preload function in an axial torque limiter. Thus, housings and other components are subjected to lower loads by virtue of the radial torque limiter as the high load components contain the load within themselves usually by way of stress. Thus, the radial torque limiter of the present invention will be smaller, lighter and possibly less costly to manufacture than an axial torque limiter.

The above and other objects, features, and advantages of the present invention will become more apparent from the following description when taken in connection with the accompanying drawings which show, for the purpose of illustration only, two embodiments in accordance with the present invention.

BEST MODE FOR CARRYING OUT THE INVENTION

Figure 1:
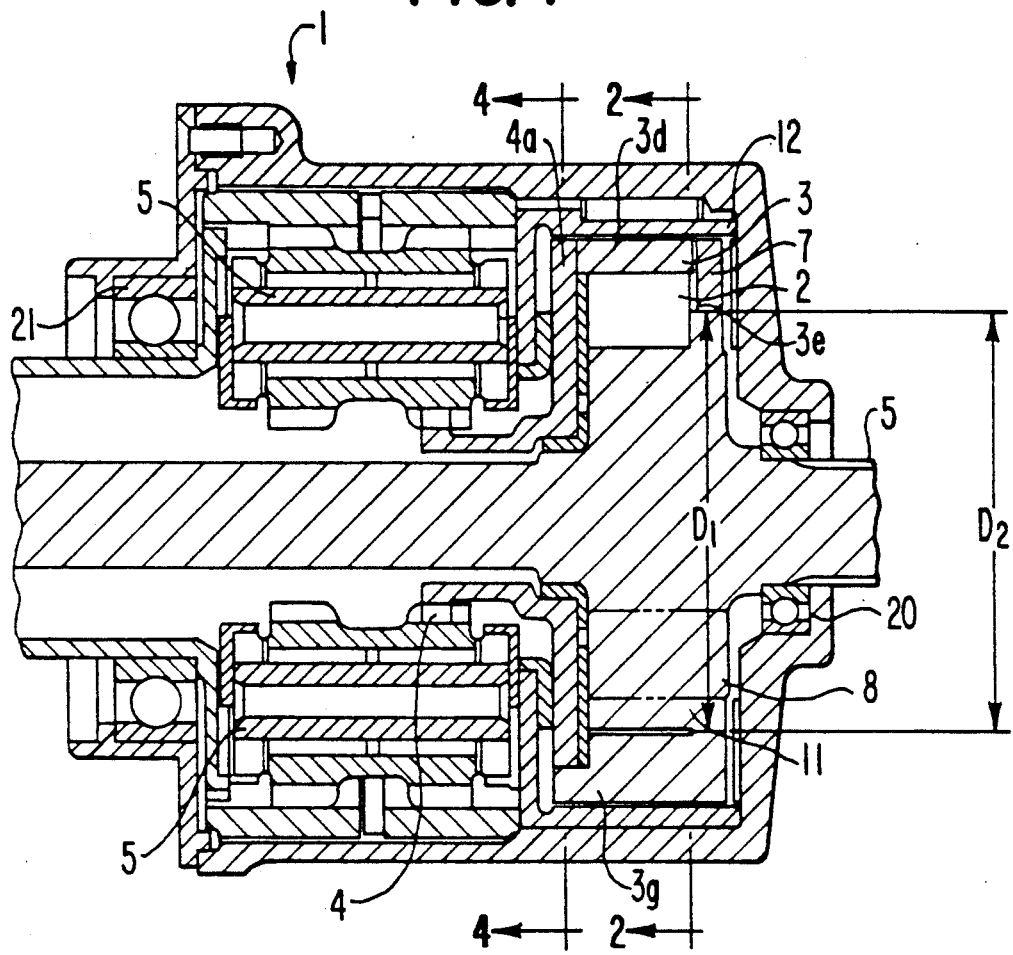
FIG. 1 is a partial longitudinal cross-sectional view of a geared rotary actuator utilizing a radial torque limiter constructed in accordance with the present invention.
Figure 4:
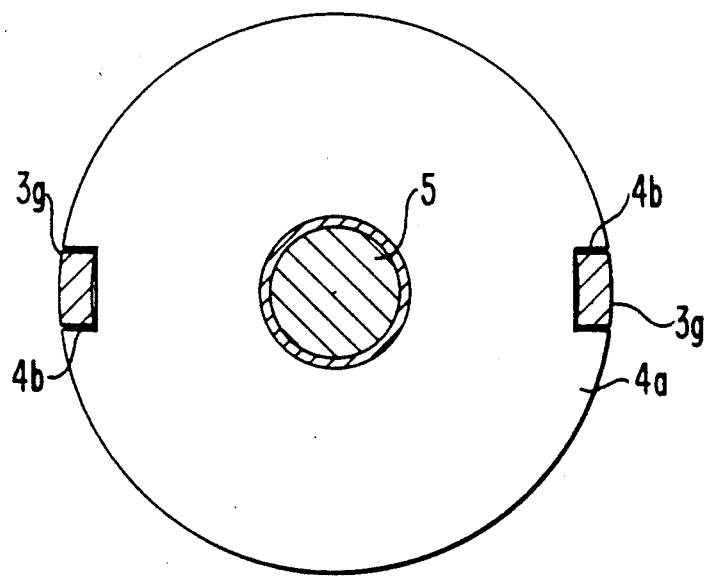
FIG. 4 is a cross-sectional view of the tab drive arrangement of the radial torque limiter of the present invention taken along the line 4—4 in FIG. 1.

Referring now to the drawings wherein like reference numerals are used throughout the various views to designate like parts and, more particularly, to FIG. 1, according to this figure, a geared rotary actuator generally designated by the reference numeral 1, for example, for actuating primary or secondary control surfaces of an aircraft, includes an input shaft S operatively connected to a suitable drive source (not shown), with a torque of the input shaft S being transmitted through roller elements 2 to an output member 3. The output member 3 includes tabs 3g forming a tab drive for a sun gear 4 provided on a carrier 4a having notches or slots 4b arranged at diametrically opposite peripheral portions thereof as shown most clearly in FIG. 4 for accommodating the respective tabs 3g. The actuator includes a plurality of planets 5 meshing with the sun gear 4 to provide a suitable output from the actuator in a conventional manner.

Figure 2:
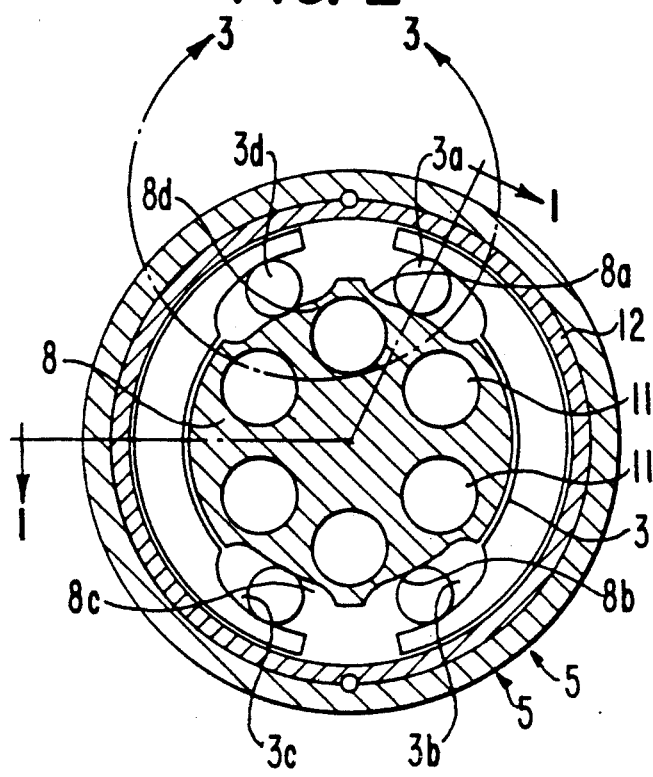
FIG. 2 is a cross-sectional view taken along the line 2—2 in FIG. 1, showing four roller elements provided with such elements being divided in pairs for each direction of torque input and limiting, with the pairs of roller or ball elements being diametrically opposed to each other.
Figure 3:
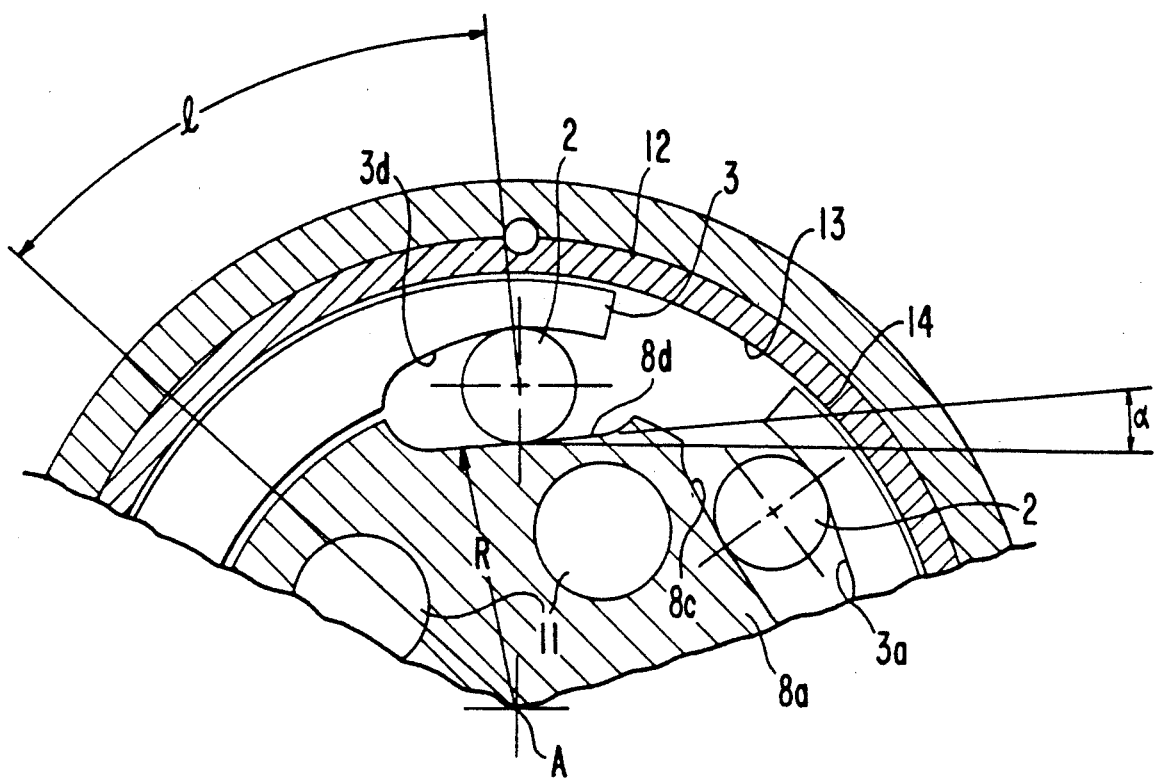
FIG. 3 is an enlarged detail view of the radial torque limiter of the present invention taken along the line 3—3 in FIG. 2.

As shown most clearly in FIGS. 2 and 3, the radial torque limiter of the present invention, for a bidirectional application, includes two pair of diametrically opposed rollers 2 arranged between an input portion 8 of the input shaft S and the output member 3. For this purpose, the input shaft portion 8 is provided with ramp sections or surfaces 8a, 8b, 8c, 8d cooperable with corresponding ramp sections or surfaces 3a, 3b, 3c, 3d of the output member 3. The input portion 8 is, generally, integrally formed as an annular disc on the input shaft S, with suitable lightening holes 11 being provided in a conventional manner for enabling a reduction in the weight of the input assembly. The ramp sections or surfaces 8a, 8b, 8c, 8d each have a first portion arranged on a constant radius R from a center axis A of the input shaft S and an inclined portion, having an inclination angle $\alpha$ usually between 5° and 30° with respect to the first portion of the respective ramp sections or surfaces 8a, 8b, 8c, 8d.

Figure 5:
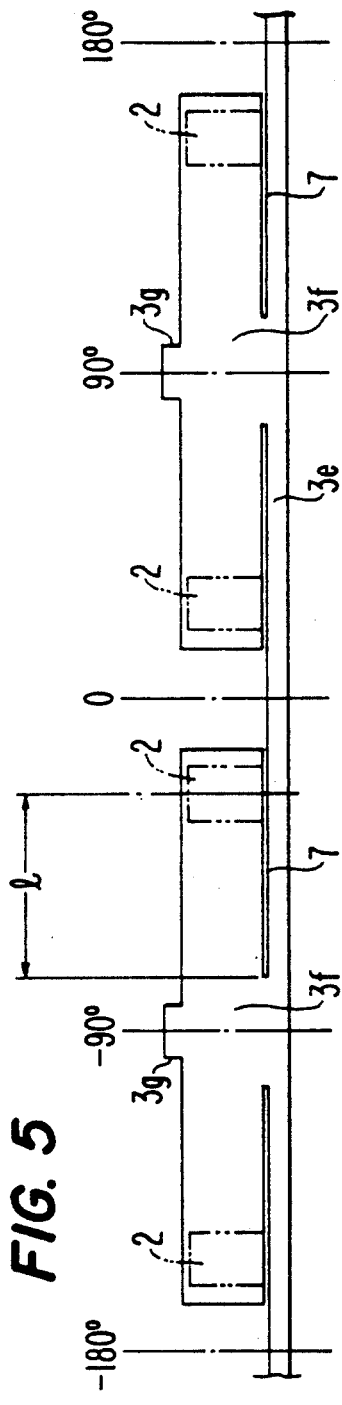
FIG. 5 is a roll-out view of the output member of the radial torque limiting device of the present invention taken along the line 5—5 in FIG. 2.

The output member 3 is formed as an annular ring or disc and, as shown most clearly in FIG. 5, includes a main portion 3f and an annular band portion 3e. Preferably, the output member 3 is fashioned of a steel having high strength properties and may, for example, be a carburized or through-hardened part for providing a high bearing strength capability especially in the contact area between the roller elements 2 and the output member 3. The main portion 3f is separated from the annular band portion 3e by slots 7 cut into the output member 3. The slots 7 are dimensioned so as to provide a bridging portion between the main portion 3f and the band portion 3e such that the main portion 3f forms two beam springs respectively disposed on opposite circumferentially spaced sides of the bridging portion, with each beam spring having an effective length l. By virtue of the provision of the bridging portion, the band portion 3e serves to support the respective beam springs formed by the main portion 3d.

Advantageously, the tabs 3g are provided on the output member on a side thereof opposite the respective bridge portions and, preferably, at a position substantially centrally disposed between the ramp sections 3a–3b and 3c–3d so as to provide a stiffer, more rigid output member 3 having ideal behavioral characteristics.

In normal operation, input torque is supplied to the input shaft S and from the input portion 8, through roller elements 2, to the output member 3. The output member 3, through tabs 3g, drives the sun gear 4 which, in turn, provides an output from the actuator 1 through the planets 5 in a conventional manner. Upon exceeding a predetermined torque limit due to, for example, severe drag or, in the worst case, a jam at the actuator output, the differential or relative movement between the input member 8 and output member 3 causes the roller elements 2 to move up the inclined angle portions of the ramp sections 8a, 8c or 8b, 8d, thereby causing the associated beam springs to bend radially outwardly and move the radially outer surface 14 of the output member 3 beam spring into contact with an opposing inner surface 13 of a reaction member 12 thus braking the output member 3 and the entire drive system of the actuator 1 through a self-engaging wedging action of the rollers and ramps.

Figure 6:
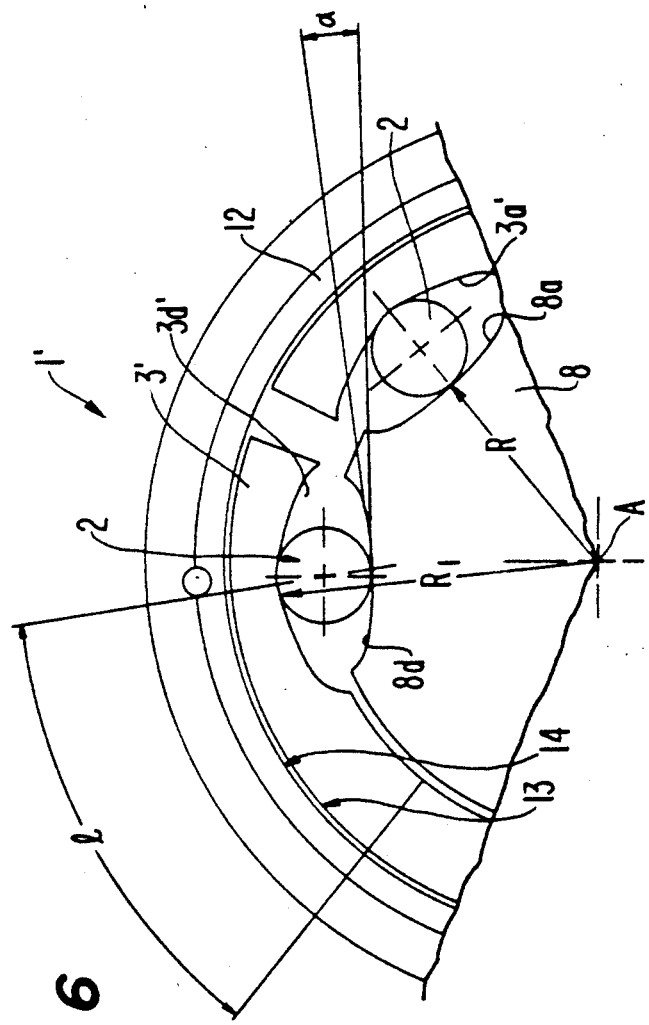
FIG. 6 is an enlarged detail view similar to FIG. 3 of another embodiment of a radial torque limiter constructed in accordance with the present invention. This embodiment incorporates bidirectional torque limiting action within each beam spring and roller set.

FIG. 6 provides an example of an alternative embodiment of a radial torque limiter constructed in accordance with the present invention, wherein an output member 3' is provided and arranged in the same manner as described hereinabove in connection with the output member 3; however, the output member 3' provides a symmetrical beam spring arrangement with a two sided radial ramp angle for the ramp sections to provide for a bidirectional torque limiting for each roller element 2 and beam spring set, that is, the ramp sections or surfaces 3a', 8a', and 3d', 8d' and diametrically opposed ramp sections or surfaces (not shown) and corresponding to ramp sections or surfaces 3b, 8b and 3c, 8c, with each ramp section or surface including two inclined portions having opposite inclination angles $\alpha$ with respect to a line of symmetry through the rotational axis.

By virtue of the above alternate embodiment of the present invention, it is possible to make full use of each beam spring and roller set and also to provide a direction-sensitive engagement torque due to different effective beam spring lengths for the respective ramp surfaces or sections. In all other respects the output member 3' and rotary actuator 1' correspond to the output member 3 and rotary actuator 1 described hereinabove in connection with FIGS. 1–5.

While each of the above described embodiments provide for two pairs or sets of roller elements 2, as can readily be appreciated, it is also possible in accordance with the present invention to provide a geared rotary actuator wherein only one pair of rolling elements 2 are provided, with the respective rolling elements being disposed at diametrically opposite positions of the geared rotary actuator, thereby resulting in a unidirectional radial torque limiting device. Correspondingly, three or more pairs of rolling elements can be used, given sufficient circumferential space in the design.

In order to ensure a concentricity between the input portion 8 and the output member 3 or 3', an area of the input portion 8 and output member 3 or 3' are dimensioned at a close tolerance so as to provide for a piloting and guidance of the output member 3 or 3' by the input portion 8. Thus, a diameter $D_1$ of the input portion 8 in an area of the band portion 3e and an internal diameter $D_2$ are selected so as to maintain a slight clearance between the input portion 8 and band portion 3e. This piloting is significant since the input portion 8 is mounted on bearings 20, 21 (FIG. 1) so that the entire input assembly runs true; however, the output member 3 or 3' is not supported by anything other than the input portion 8 and, consequently, a very close tolerance set of diameters $D_1$, $D_2$ is necessary so as to stabilize the output member 3 or 3' providing the output to drive the sun gear 4 and ultimately the planets 5. Thus, the piloting ensures a correct location of the sun gear 4 for meshing with the planet 5 and provides for a fixing of the output member 3 relative to the longitudinal center axis of the shaft S. The clearance provided between the input member and output member achieves a loose fit and, may, for example, be on the order of 0.002" to 0.010". The significant point is to provide a clearance to enable a free rotation between the input portion 8 and the output member 3 or 3' with respect to each other, with such clearance being small enough so as to provide an effective piloting and positioning of the output member 3 or 340.

While we have shown and described two embodiments in accordance with the present invention, it is understood that the same is not limited thereto but is susceptible to numerous changes and modifications as known to one of ordinary skill in the art, and we therefore do not wish to be limited to the details shown and described herein, but intend to cover all such modifications as are encompassed by the scope of the appended claims.

We claim:

1. A torque limiter comprising means defining an input torque path for a system, means cooperable with said means defining the input torque path for defining an output torque path of the system, and means radially outwardly displaceable in response to an excess torque for radially applying a braking force between said means defining the input torque path and means defining the output torque path so as to brake the input and output torque paths upon the occurrence of the excess torque.

2. A torque limiter according to claim 1, wherein said means defining an input torque path includes an input member, said means defining the output torque path includes an output member concentrically disposed with respect to the input member, and said means radially applying includes spring means radially outwardly displaceable in response to the excess torque.

3. A torque limiter according to claim 2, wherein the spring means includes at least two springs, and wherein said means radially applying further includes at least two diametrically opposed roller means associated with the respective springs, with said roller means being interposed between the input member and associated spring, and ramp means interposed between the respective springs and said input member and cooperable with the roller means to enable a displacement of the roller means in response to a relative rotation between the input member and output member as a result of the excess torque.

4. A torque limiter according to claim 3, wherein said ramp means are formed in said input member and said springs.

5. A torque limiter according to claim 4, wherein said braking force is applied between an outer surface of the respective springs and an inner surface of a grounded reaction member.

6. A torque limiter according to claim 5, wherein said output member is an annular ring having slot means therein for dividing said annular ring into a main body portion, an annular band portion, and at least two bridging portions connecting the annular band portion to the main body portion, and wherein said springs are formed from the main body portion as beam springs respectively having a fixed end at the respective bridging portions and a free end so as to enable the radial displacement thereof by the roller means.

7. A torque limiter according to claim 6, wherein said output member further includes at least a pair of axially extending tab means for transmitting a driving torque from the output member to a connected torque transmitting component.

8. A torque limiter according to claim 7, wherein said tab means are disposed at diametrically opposite positions and positioned substantially centrally between the ramp means.

9. A torque limiter according to claim 8, wherein a diameter of a portion of the input member and an internal diameter of the annular band portion are dimensioned so as to provide a slight clearance therebetween.

10. A torque limiter according to claim 2, wherein said spring means includes at least four springs, said means for radially applying further includes at least two pair of diametrically oppositely disposed roller means for transmitting torque between the input member and output member during a normal operation of the system, said roller means being respectively associated with the respective springs, and ramp means interposed between the respective springs and said input means and cooperable with the respective roller means for enabling a displacement of the roller means in response to a relative rotation between the input member and output member as a result of excessive torque to radially outwardly displace the respective springs and brake the input and output torque paths.

11. A torque limiter according to claim 10, wherein said ramp means are formed at each of the said input means and the respective springs.

12. A torque limiter according to claim 11, wherein said braking force is applied between an outer surface of each of said springs and an inner surface of said reaction member.

13. A torque limiter according to claim 5, wherein said output member is an annular ring having a slot means therein for dividing said annular ring into a main body portion, an annular band portion, and at least two bridging portions connecting the annular band portion to the main body portion, and wherein said springs are formed from the main body portion as beam springs each having a fixed end extending from opposite circumferentially spaced sides of the respective bridge portions and a free end so as to enable a radial displacement thereof.

14. A torque limiter according to claim 13, wherein said output member further includes at least a pair of axially extending tab means for transmitting a driving torque to said at least one sun gear.

15. A torque limiter according to claim 14, wherein said tab means are disposed at diametrically opposite positions and circumferentially spaced so as to be centrally located between adjacent pairs of the ramp means.

16. A torque limiter according to claim 15, wherein a diameter of a portion of the input member and an internal diameter of the annular band portion are dimensioned so as to provide a slight clearance therebetween.

17. A torque limiter according to claim 16, wherein the ramp means are formed on both sides of the roller elements so as to enable a bidirectional torque limiting.

* * * * *